(12) United States Patent
Cusumano et al.

(10) Patent No.: US 11,344,983 B2
(45) Date of Patent: May 31, 2022

(54) WORKSTATION

(71) Applicant: BUCCI AUTOMATIONS S.P.A., Faenza (IT)

(72) Inventors: Dario Cusumano, Faenza (IT); Nicolo' Vincenzi, Faenza (IT)

(73) Assignee: BUCCI AUTOMATIONS S.P.A., Faenza (IT)

( * ) Notice: Subject to any disclaimer, the term of this patent is extended or adjusted under 35 U.S.C. 154(b) by 217 days.

(21) Appl. No.: 16/438,549

(22) Filed: Jun. 12, 2019

(65) Prior Publication Data
US 2019/0375063 A1    Dec. 12, 2019

(30) Foreign Application Priority Data

Jun. 12, 2018   (IT) .................. 102018000006219

(51) Int. Cl.
*B23Q 3/06* (2006.01)
(52) U.S. Cl.
CPC .................... *B23Q 3/069* (2013.01)
(58) Field of Classification Search
CPC ... B23Q 3/00; B23Q 3/02; B23Q 3/06; B23Q 3/069; B23Q 3/152
USPC ............... 269/55, 57, 60, 271, 289 R, 291
See application file for complete search history.

(56) References Cited

U.S. PATENT DOCUMENTS

| | | | | | |
|---|---|---|---|---|---|
| 3,153,355 | A | * | 10/1964 | Opperthauser | B23Q 1/522 269/57 |
| 3,647,043 | A | * | 3/1972 | Garetto | B23Q 39/042 198/345.3 |
| 4,505,624 | A | * | 3/1985 | Kelly, Jr. | B23Q 3/069 269/208 |
| 8,439,338 | B2 | * | 5/2013 | Taniguchi | B23Q 11/127 269/55 |

FOREIGN PATENT DOCUMENTS

| | | | |
|---|---|---|---|
| CH | 497225 A | 10/1970 | |
| CH | 695486 A5 * | 6/2006 | ........... B23Q 39/042 |
| CH | 695486 A5 | 6/2006 | |
| DE | 3507224 A1 | 9/1986 | |
| FR | 2430820 A1 | 2/1980 | |

OTHER PUBLICATIONS

Machine Translation—CH 695486 (Year: 2006).*
IT Search Report dated Jan. 23, 2019 re: Application No. 102018000006219, pp. 1-8, , citing: CH 497 225 A, FR 2 430 820 A1, CH 695 486 A5 and DE 35 07 224 A1.

* cited by examiner

*Primary Examiner* — Lee D Wilson
*Assistant Examiner* — Alberto Saenz
(74) *Attorney, Agent, or Firm* — Cantor Colburn LLP

(57) ABSTRACT

A workstation includes at least one machining station with a fixed base provided with at least one tool, and at least one clamping assembly, for at least one workpiece to be machined, which can move between at least one configuration of alignment with a machining station and at least one configuration that is misaligned with respect to that station.

(Continued)

The center has a fixed footing, which is provided with a substantially central post for supporting a supporting surface for supporting the at least one machining station, a motor drive unit being coupled to the post.

The rotating portion of the motor drive unit is coupled to a turntable which is arranged so as to face and be proximate and parallel to the supporting surface. The at least one clamping assembly is integral with the tool.

7 Claims, 2 Drawing Sheets

WORKSTATION

CROSS REFERENCE TO RELATED APPLICATIONS

This application claims priority to Italian Patent Application No. 102018000006219, filed on Jun. 12, 2018, the contents of which are hereby incorporated by reference in their entirety.

TECHNICAL FIELD

The present disclosure relates to a workstation, of the CNC type (computer numerical control) and the like, which is adapted to execute specific mechanical machining operations on specific workpieces. Generally workstations carry out machining with removal of shavings, such as for example perforation, milling and the like.

BACKGROUND

It is known to use this type of device for machining operations which involve several consecutive steps: in fact a workstation can have a preset number of stations and the workpiece to be machined, by passing from one station to the subsequent stations, will undergo a series of mechanical machining operations that corresponds to the sequence of intended operational steps.

The use is frequent of deployments of machining stations along a circular trajectory, for the purpose of enabling the workpiece to undergo all the necessary operations while it is moved along a circular trajectory.

In this manner it is sufficient to arrange the clamping assemblies intended to support the workpieces to be subjected to machining on a rotating carousel, so that they can be progressively aligned with the machining stations.

This type of workstation, although particularly efficient and offering reduced space occupation (with respect to a version in which the workpieces to be subjected to machining move along a linear trajectory), implies the provision of fixed machining stations that are outside the carousel (thus complicating the installation and adjustment of the workstation) or the use of cantilevered clamping assemblies (mounted on long supporting arms).

The length of the supporting arms can negatively affect the precision of machining, in that they can be subject to bending when the tool of the machining station makes contact with the workpiece during the machining.

To guard against any bending, it is necessary to over-dimension the arms, but this makes the corresponding movement and the specific positioning more complex and burdensome (the phenomena of inertia can introduce deviations from the ideal configuration of alignment).

SUMMARY

The principal aim of the present disclosure is to solve the above mentioned drawbacks, by providing a workstation which offers reduced space occupation and is easily installed.

Within this aim, the disclosure provides a workstation that offers high precision of machining.

The disclosure also provides a workstation that offers high precision in terms of positioning and alignment of the workpieces being machined with the machining stations.

The present disclosure further provides a workstation that is of low cost, easily and practically implemented and safe in use.

This aim and these and other advantages that will become better apparent hereinafter are achieved by providing a workstation of the type comprising at least one machining station with a fixed base provided with at least one tool, and at least one clamping assembly, for at least one workpiece to be subjected to machining, which can move between at least one configuration of alignment with a machining station and at least one configuration that is misaligned with respect to said station, characterized in that it comprises a fixed footing, which is provided with a substantially central post for supporting a supporting surface for at least one machining station, a motor drive unit, which is coupled to the post, the rotating portion of the motor drive unit being coupled to a turntable which is arranged so as to face and be proximate and parallel to said supporting surface, said at least one clamping assembly being integral with said turntable.

BRIEF DESCRIPTION OF THE DRAWINGS

Further characteristics and advantages of the disclosure will become better apparent from the detailed description that follows of a preferred, but not exclusive, embodiment of the workstation according to the disclosure, which is illustrated by way of non-limiting example in the accompanying drawings, wherein.

DETAILED DESCRIPTION OF THE DRAWINGS

Figure 1:
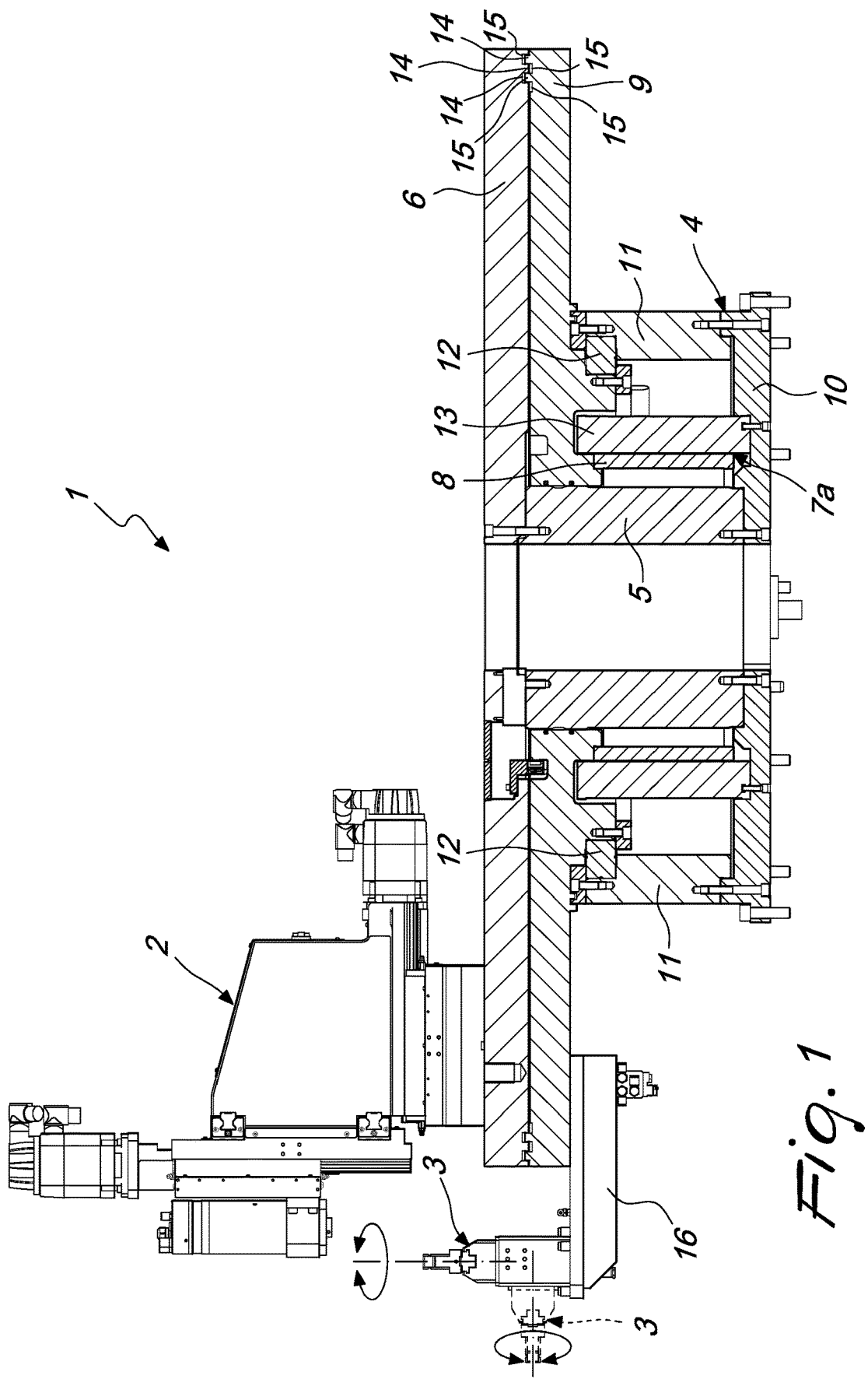
FIG. 1 is a cross-sectional side view taken along a transverse plane of a workstation according to the disclosure.
Figure 2:
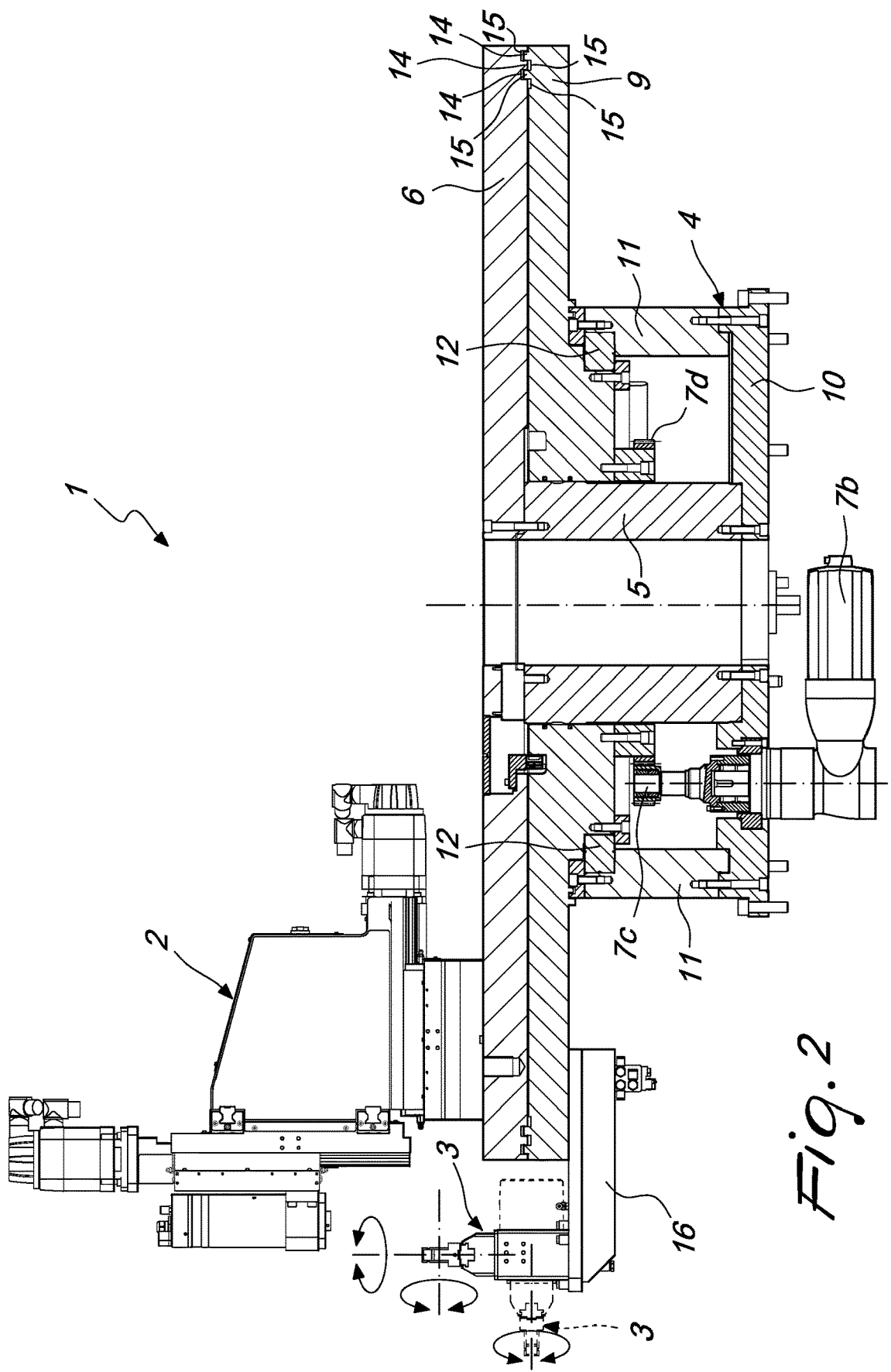
FIG. 2 is a cross-sectional side view taken along a transverse plane of a workstation according to a second embodiment.

With particular reference to FIGS. 1 and 2, the reference numeral 1 generally designates a workstation according to the disclosure.

The workstation 1 according to the disclosure comprises at least one fixed machining station 2 which is provided with at least one tool, and at least one clamping assembly 3, for at least one workpiece to be subjected to machining.

The clamping assembly 3 can move between at least one configuration of alignment with the at least one machining station 2 and at least one configuration that is misaligned with respect to that station 2.

With particular reference to an embodiment of undoubted practical and applicative interest, it should be noted that the clamping assembly 3, for the at least one workpiece to be subjected to machining, can conveniently comprise means for articulating its portion for restraining the workpiece to be subjected to machining Such restraining portion will therefore be provided with at least one degree of freedom which is preferably selected from rotation about a vertical and/or horizontal axis and translation according to a predefined stroke.

It should be noted that in a preferred solution, the clamping assembly 3 can rotate its restraining portion about a vertical axis and about a horizontal axis.

The workstation 1 according to the disclosure further comprises a fixed footing 4, which is provided with a substantially central post 5 for supporting a supporting surface 6 for the at least one machining station 2.

The workstation also comprises a motor drive unit, preferably selected from a torque motor 7a, an assembly constituted by motor 7b—pinion 7c—crown gear 7d, an assembly constituted by motor/belt/pulley, an assembly constituted by motor-chain-ring gear and the like. However, the possibility is not ruled out of using different kinds of motor drive unit.

With particular reference to the embodiment that involves the use of a torque motor 7a as the motor drive unit, it should be noted that this will be fitted over the post 5: the rotor ring 8 of the torque motor 7a will advantageously be coupled to a turntable 9 which is arranged so as to face and be proximate and parallel to the supporting surface 6.

The at least one clamping assembly 3 will positively be integral with the turntable 9, and therefore will be able to move integrally with it and be aligned/misaligned with the at least one machining station 2.

Implementation solutions that involve the substitution of the torque motor 7a with other types of motor drive unit are intuitive for any person skilled in the art and for this reason they will not be described specifically, even though they are comprised in the scope of protection defined by the present description.

It should be noted that, according to an embodiment of undoubted practical and applicative interest, the fixed footing 4 comprises a lower plate 10 which is provided with elements for coupling to a lower frame which is integral with the ground.

It should furthermore be noted that the substantially central post 5 can be conveniently fixed, in a lower region, to the lower plate 10 and, in an upper region, to the fixed supporting surface 6: such fixing points are provided by way of respective threaded elements. However, the possibility is not ruled out of using different coupling elements.

It should furthermore be noted that the workstation 1 can comprise an external support 11 which is advantageously coupled to the outer portion, proximate to the corresponding perimetric edge, of the footing 4.

The external support 11, in such case, will profitably comprise respective bearings 12, substantially at its upper face, for supporting the turntable 9.

It should be noted that the bearings 12 interposed between the external support 11 and the turntable 9 can be of the type selected from crossed roller bearings, conical bearings and the like. Generally, bearings are used that are adapted to exert an axial and radial action, therefore ensuring the support of the turntable 9 and maintaining its correct alignment.

With particular reference to the embodiment of greater interest in terms of practical implementation, it should be noted that the torque motor 7a comprises a fixed stator ring 13, which is stably coupled to the fixed footing 10, and a rotor ring 8, which can rotate with respect to the stator ring 13, which is integral with the turntable 9.

The torque motor 7a is conveniently outside the post 5 and inside the external support 11: the torque motor 7a, the post 5 and the external support 11 are all coaxial.

It should furthermore be specified that, along the surfaces that face toward and are proximate to the turntable 9 and the supporting surface 6, mutually complementary respective crests 14 and troughs 15 are defined: the crests 14 and the troughs 15 are mutually interpenetrating.

It should be noted that, with particular reference to embodiments of high efficiency and productivity, the machining stations 2 can positively be a plurality, angularly distributed along the supporting surface 6, and fixed thereto in an upper region.

Each machining station will comprise respective movement drives for a spindle, inside which the corresponding tool will be coupled.

Similarly, the clamping assemblies 3 can also be a plurality, angularly distributed along the turntable 9, and fixed thereto in a lower region by way of radial arms 16.

A large number of clamping assemblies 3 allows the simultaneous execution of machining in sequence of a series of workpieces, while ensuring a high productivity level of the workstation 1.

The particular structure of the workstation 1 makes it possible to avoid cantilevered clamping assemblies 3 (in fact the clamping assemblies 3 are coupled to the turntable 9 by way of arms 16 with minimal projection from the edge of the turntable 9).

With particular reference to an embodiment of safe implementation, the machining station 2 provided with at least one tool can conveniently comprise articulation elements for moving the tool with at least three degrees of freedom, thus providing a machining station 2 of the type usually defined in the reference technical sector as a "three-axis functional unit".

Advantageously the present disclosure solves the above mentioned problems, by providing a workstation 1 which offers reduced space occupation and is easily installed.

In fact the correct alignment of the machining stations 2 with the clamping assemblies 3 is ensured by the very structure of the workstation 1 and therefore no particular precautions are required at installation time (all the components are coupled to the same footing 4).

Conveniently the workstation 1 offers a high level of precision of machining. In fact the reciprocal position of the machining stations 2 and of the clamping assemblies 3 is ensured by the presence of the bearings 12 and of the couplings between the crests 14 and the troughs 15.

Conveniently the workstation 1 ensures that a high level of precision is obtained in terms of positioning and alignment of the pieces being machined with the machining stations 2: if the torque motor 7a, for example, is adopted as the motor drive unit then a particular level of precision is obtained, and the torque motor 7a can furthermore be managed through types of control logic aimed at minimizing positioning error. Similar levels of precision can be obtained by way of other types of motor drive unit, subjected to specific types of control logic.

Advantageously the workstation 1 according to the disclosure is particularly ergonomic and easy to use for the operating personnel: the turntable 9 is in fact easily accessed from outside for carrying out any format change operation or maintenance, thus ensuring that all the components involved are easily reachable.

Advantageously the workstation 1 according to the disclosure is easily and practically implemented and is of low cost: such characteristics make the workstation 1 according to the disclosure an innovation that is safe in use.

The disclosure, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

What is claimed is:

1. A workstation comprising:
a plurality of machining stations, each having a fixed base provided with at least one tool, and at least one clamping assembly, which moves between at least one configuration of alignment with a respective machining station and at least one configuration that is misaligned with respect to said respective machining station;
a fixed footing provided with a central post wherein the central post supports a supporting surface for supporting the at least one machining station, and
a motor drive unit coupled to the post, a rotating portion of the motor drive unit being coupled to a turntable which is arranged so as to face and be proximate and parallel to said supporting surface, said at least one clamping assembly being integral with said turntable,
wherein said motor drive unit is constituted by a torque motor which comprises a fixed stator ring stably coupled to said fixed footing, and a rotor ring, configured to rotate with respect to said stator ring, which is integral with said turntable, and wherein said machining stations are angularly distributed along said supporting surface, and are fixed thereto in an upper region.

2. The workstation according to claim 1, wherein an external support is coupled to an outer portion, proximate to the corresponding perimetric edge, of said footing, said external support comprising components chosen from a plurality of bearings configured to support rotation, substantially at its upper face, to support said turntable.

3. The workstation according to claim 2, wherein said bearings interposed between said external support and said turntable are crossed roller bearings or conical bearings.

4. The workstation according to claim 1, wherein said torque motor is disposed outside said post and is disposed inside an external support, wherein said torque motor, said post, and said external support are all coaxial.

5. The workstation according to claim 1, wherein said motor drive unit is constituted by an assembly constituted by a controlled electric motor which supports a pinion integral with a shaft of said electric motor, and a ring coupled to said pinion and integral with said turntable.

6. The workstation according to claim 1, further comprising a plurality of clamping assemblies angularly distributed along said turntable and fixed in a lower region by a plurality of radial arms.

7. The workstation according to claim 6, wherein said plurality of clamping assemblies comprise at least one restraining element configured to articulate a restraining portion, said restraining portion having at least one degree of freedom which is chosen between the rotation about a vertical and/or horizontal axis and the translation according to a predefined stroke.

* * * * *